US006469817B1

United States Patent
Heflinger

(10) Patent No.: US 6,469,817 B1
(45) Date of Patent: Oct. 22, 2002

(54) APPARATUS AND METHOD EMPLOYING TWO OPTICAL SIGNALS FOR STABILIZING AN OPTICAL INTERFEROMETER

(75) Inventor: Donald G. Heflinger, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/336,248

(22) Filed: Jun. 18, 1999

(51) Int. Cl.[7] .......................... H04B 10/00; H04B 10/06
(52) U.S. Cl. ...................... 359/189; 359/154; 359/161
(58) Field of Search ................................ 359/189, 154, 359/161, 173, 195, 333, 334, 335, 336; 341/137

(56) References Cited

U.S. PATENT DOCUMENTS

| | | | | |
|---|---|---|---|---|
| 5,978,129 A | * | 11/1999 | Jourdan et al. | 359/326 |
| 6,069,534 A | * | 5/2000 | Kobayashi | 250/214 A |
| 6,246,500 B1 | * | 6/2001 | Ackerman | 359/154 |
| 6,252,692 B1 | * | 6/2001 | Roberts | 359/110 |
| 6,396,605 B1 | * | 5/2002 | Heflinger et al. | 359/154 |

OTHER PUBLICATIONS

Eric A. Swanson, Jeffrey C. Livas, and Roy S. Bondurant, "High Sensitivity Optically Preamplified Direct Detection DPSK Receiver With Active Delay–Line Stabilization", IEEE Photonics Technology Letters, vol. 6, No. 2, Feb. 1994, pp. 263–265.

* cited by examiner

Primary Examiner—Leslie Pascal
Assistant Examiner—Dalzid Singh
(74) Attorney, Agent, or Firm—Robert W. Keller

(57) ABSTRACT

An apparatus and a method for stabilizing an optical interferometer using two optical signals that differ in wavelength by a factor of two is disclosed. The optical interferometer has an optical path length that is tunable. It develops a first interference pattern when the original optical signal is present and the optical path length is a prescribed value. When a second optical signal that has a wavelength that is twice or one-half of the original is dithered and a path length adjustment drive signal is present the interferometer develops a second interference pattern when the optical path length is the prescribed value. An optoelectronic detector is responsive to the second optical interference pattern and develops an electronic feedback signal when the second interference pattern is not present. Accordingly, a feedback circuit produces the optical path length adjustment drive signal, which serves to change the optical path length until it reaches the prescribed value to restore both the second interference pattern and the first interference pattern, thereby tuning the optical interferometer.

19 Claims, 1 Drawing Sheet

APPARATUS AND METHOD EMPLOYING TWO OPTICAL SIGNALS FOR STABILIZING AN OPTICAL INTERFEROMETER

CROSS-REFERENCE TO RELATED APPLICATIONS

This application is related to three commonly assigned applications entitled: "Apparatus And Method For Tuning An Optical Interferometer", having inventors Donald Heflinger, Jeffrey Bauch and Todd Humes, filed on Jan. 26, 1999, Ser. No. 09/236,981; "All Optical Analog To Digital Converter", having inventor Donald Heflinger; filed on Jun. 17, 1998, Ser. No. 09/089,844; and "Active Multimode Optical Signal Splitter", having inventor Charles Zmudzinski, filed on May 30, 1997, Ser. No. 08/866,656.

BACKGROUND OF THE INVENTION

1. Field of the Invention

The present invention relates to optical communication systems, and more particularly to an apparatus and method for tuning an optical interferometer.

2. Description of the Prior Art

An optical interferometer provides a means to detect changes in the wavelength of light by causing a change in light level resulting from the change in the interference state in its output. Optical interferometers made using optical fiber or silica waveguide are not stable devices. They are particularly susceptible to uncontrollable conditions, such as temperature variations. As the temperature Ad proximate the optical interferometer changes, the path length of the optical fibers or silica waveguide making up its legs likewise change. This results in a change in the interference pattern created by the optical interferometer. To compensate, the optical interferometer must be tuned continuously.

An apparatus and method for tuning an optical interferometer is known in the art. An example of such an apparatus is described in an article by Eric A. Swanson, Jeffrey C. Livas and Roy S. Bondurant, entitled "High Sensitivity Optically Preamplified Direct Detection DPSK Receiver With Active Delay-Line Stabilization," in IEEE Photonics Technology Letters, Vol. 6, No. 2, Feb. 1994. This article describes an optical communication system that modulates digital information onto transmitted light using differential phase shift keying (DPSK) and then demodulates this information using an actively tuned unbalanced Mach-Zehnder optical interferometer that is tuned using an apparatus and a method known in the art. The unbalanced Mach-Zehnder optical interferometer has an additional optical path length in one leg that provides a propagation delay duration of one data bit. The imbalance in the Mach-Zehnder optical interferometer enables light in one data bit to be optically interfered with light in the data bit immediately following this data bit. The relative state of optical phase between these two DPSK data bits determines in which of the two output legs of the interferometer light is produced provided that the unbalanced Mach-Zehnder optical interferometer is properly tuned within a fraction of a wavelength of the light. Light produced from one leg constitutes digital "ones" while light produced in the other leg constitutes digital "zeros" in the transmitted digital information signal. This article also describes an apparatus and a method for using optical amplification to improve receiver sensitivity that utilizes a doped optical fiber amplifier to boost the signal level and a Fabry-Perot narrow band filter to remove the out-of-band amplified spontaneous emission (ASE) introduced by the fiber amplifier.

The apparatus described in the article includes a laser and a phase modulator for producing an optical DPSK signal at a preselected wavelength, a 10 GHz tunable fiber Fabry-Perot filter and an automatic controller for dithering the pass band wavelength of the filter so as to keep the peak of the filter at the optical signal wavelength, a tunable unbalanced Mach-Zehnder optical interferometer, a dual balanced detector and a feedback electronic circuit coupling the signal developed across one detector of the balanced detector to one leg of the Mach-Zehnder interferometer. Two different approaches are described for tuning the optical path length in the unbalanced Mach-Zehnder optical interferometer. In the first approach, the interferometer is made of optical fiber and one leg of the interferometer is wrapped around a piezoelectric transducer (PZT) that enables an electronic signal to stretch the fiber, thereby increasing the optical path length. In the second approach, the interferometer comprises a silica integrated optical waveguide with an integral thermal heater that enables an electronic signal to increase the temperature of one leg of the interferometer, thereby increasing the optical path length. To tune the Mach-Zehnder interferometer a small electronic dither signal is applied to the actively tuned optical path length to provide a feedback signal for the electronic controller. This enables proper adjustment of the optical path length. Electronic synchronous detection techniques on this dither signal are used to provide the appropriate corrections to the optical path length, enabling the error in tuning to be below an acceptable level.

The prior art approaches for actively tuning an optical interferometer have several disadvantages. First, they introduce an undesired optical intensity dither on top of the original optical communication signal that is intended to be extracted. This dither arising from the intentional dither of the optical path length is actually a source of noise that degrades the fidelity of the original communications signal. Second, the approach using the heater to perform the dither and tuning is restricted to relatively low frequencies of dither due to the relatively large thermal time constant of the heater. Third, the approaches introduce a small dithering variation in the interference state delivered at the output of the Mach-Zehnder interferometer. This precludes the use of the interferometer in applications where an absolute quiet state of interference must be maintained.

What is needed, therefore, is an apparatus for stabilizing an optical interferometer that utilizes an additional optical signal to tune the optical interferometer without introducing any dither in its optical path length.

SUMMARY OF THE INVENTION

The preceding and other shortcomings of the prior art are addressed and overcome by the present invention which provides generally, in a first aspect, an apparatus and a method for using an additional optical signal having a wavelength that differs by a factor of two from the wavelength of the light originally detected by an optical interferometer to actively tune and stabilize the optical interferometer.

Briefly, the apparatus comprises a dithering signal generator, an optical interferometer having an optical path length that is tunable, means for generating an additional optical signal having a wavelength that differs from the original wavelength on which the optical interferometer is to act by a multiple of two, and means for applying the dithering signal to the first optical signal so as to slightly vary the wavelength about the multiple of two. The optical interferometer is responsive to the original optical signal to develop a first interference pattern when the interferometer is properly tuned. In this tuned state, the optical interferometer responds to the dithered optical signal to develop a similar second interference pattern. When the optical path length of one leg in the interferometer is changed, detector means responsive to the second interference pattern develop an electronic feedback signal indicating that the first interference pattern is not present, and that the interferometer requires an optical path length adjustment to become tuned. A feedback loop responds to the dithering signal and the electronic feedback signal to produce the optical path length adjustment drive signal. The optical path length adjustment drive signal serves to tune the optical path length until it reaches the prescribed value, thereby producing the first interference pattern and stabilizing the optical interferometer.

The foregoing and additional features and advantages of this invention will become apparent from the detailed description and accompanying drawing figures to below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
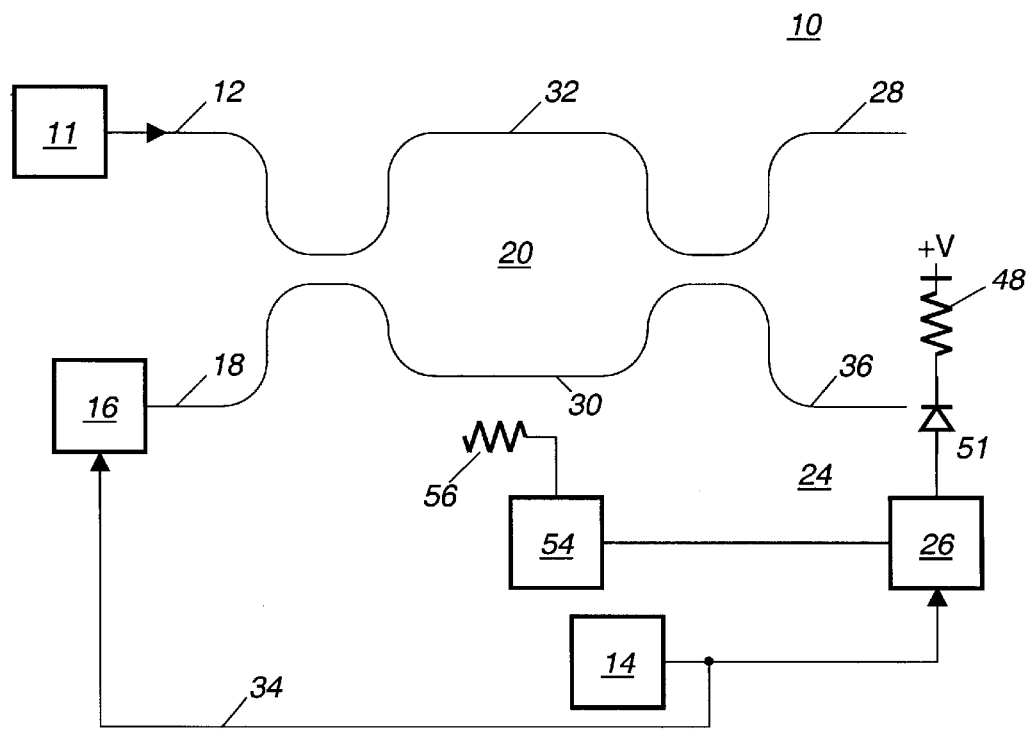
FIG. 1 is a block diagram of the apparatus for stabilizing an optical interferometer in/accordance with the present invention.

As illustrated in the diagram of FIG. 1, the present invention provides an apparatus for stabilizing an optical interferometer, generally designated by the numeral 10 and also a method for accomplishing same. Briefly, the apparatus 10 employs an optical signal that enters optical input 12, a dithering signal generator 14, a source 16 for a stabilizing optical signal, an optical interferometer 20 having an optical output 28 and a tuning leg 30 that feeds a photodetector 22 in a feedback circuit 24. The feedback circuit 24 includes a synchronous detection lock-in amplifier 26 for supplying an electrical signal to the tuning leg 30.

The optical signal entering input 12 is provided by a light source 11 that supplies an optical signal having a wavelength that is preferably 1.5 μm. This light can have its wavelength or phase vary a small amount around 1.5 μm in accordance with the information that is to be extracted by the tuned interference state of the optical interferometer and can be produced by a laser diode.

The dithering signal generator 14 is a conventional audio frequency electronic sine wave generator that is capable of providing an electronic dithering signal to both the optical source 16 and the synchronous detection lock-in amplifier 26 simultaneously. By providing the same dithering signal to optical source 16 and the lock-in amplifier it is possible to detect both the amplitude and the phase of a very small amplitude dithering signal in the presence of many other stronger signals.

The stabilizing optical signal source 16 generally comprises a laser diode that emits a beam of light that is stable in wavelength and is a multiple of a factor of two of the original light entering input 12. The wavelength of this signal is preferably 0.75 μm, which is a multiple of a factor of two, and more particularly, a multiple of one-half times the wavelength of the original optical signal entering input 12. This choice of wavelength is readily accommodated by available laser diodes since InGaAsP lasers emit at 1.5 μm and GaAlAs lasers emit at 0.75 μm. In response to current supplied by the dithering generator 14 on conductor 34, the laser diode 16 is driven with a current modulation that varies in accordance with the dithering signal. Because the wavelength of a laser diode depends on both the temperature, which is generated by a resistive heating stemming from the drive current, and the carrier density within the lasing junction, which is directly taken from the drive current, the wavelength of the laser diode is a very sensitive function of the level of the drive current. Thus, the small modulation in the drive current from the addition of the dithering signal causes the wavelength of the laser diode to vary a small amount around 0.75 μm in accordance with the dithering signal. This provides the required means of delivering an optical signal on the input 18 comprising an optical fiber, which has a dithering wavelength that varies in accordance with the dithering signal about a value that is a factor of two different from the wavelength of the light entering input 12.

The optical interferometer 20 has two inputs 12 and 18, two optical legs or paths 30 and 32 and two output ports 28 and 36. It is preferably a Mach-Zehnder interferometer made of silica waveguide material as is commercially available from Photonic Integration Research, Inc., Columbus, Ohio, Model FDM-10G-1.5-M-PM. It includes an integrated thermal heater to enable tuning of its optical leg or path 30. However, the apparatus and method of this invention can utilize many other types of optical interferometers including a Michaelson interferometer, a Sagnac interferometer, or even a Fabry-Perot interferometer. These interferometers can be made using many materials including optical fiber, free space, or silica waveguide. The optical interferometer splits light into the two separate optical legs 30 and 32 and then recombines the light interferometrically to create optical outputs that can present constructive and destructive interference. The wavelength of light and the relative optical path lengths of the two legs 30 and 32 determine the particular state of interference that takes place when the light is combined. The state of interference determines if the output presents constructive interference, in which case there is an optical intensity output, or destructive interference, in which case there is an absence of optical intensity output. When one of the two optical path lengths within the interferometer is made to be adjustable, the state of interference can be continuously varied between the constructive and destructive interference states as long as the wavelength is held constant. This enables the optical interferometer to be set to a particular state for a given wavelength of light. When the wavelength is changed, the state of interference is maintained by appropriately tuning the relative optical path length of the interferometer. Otherwise the state of interference will change as the wavelength is changed.

In this patent the phrase "optical path length" is characterized and mathematically defined as the product of the physical propagation distance and the associated refractive index of the medium through which the light propagates. It should be recognized that adjusting the optical path length can be accomplished by adjusting the physical propagation distance or adjusting the index of refraction of the medium through which the light propagates in the interferometer. The physical propagation distance can be adjusted by stretching a fiber with a piezoelectric transducer, thermally expanding the length with heat, or positioning a mirror within the interferometer via a piezoelectric piston. Adjusting the index of refraction could be accomplished by heating the medium or by an electro optic affect created via an applied electric field. In the preferred embodiment, the optical path length is changed by applying heat to thermally expand the segment of silica optical waveguide comprising leg 30 of the optical interferometer. Thermal heating can be used to perform the optical path length tuning in this invention despite the relatively long thermal time constants associated with this approach because only slow tuning adjustments are needed and dithering of the optical path is not required.

This invention utilizes the particular optical interference case where the optical path lengths are not changed when the wavelength is changed. Starting with an interference state where constructive interference occurs at one output port and destructive interference occurs at the other output port of the interferometer, this invention uses a slight change in the wavelength produced by the optical source 16, in this case by the dithering signal, where there is no immediate adjustment made to the optical path lengths in the interferometer within a time scale on the order of the dithering signal frequency. In the destructive interference output, taken as being directed to the photodetector or photodiode 22 for this example, this slight wavelength change causes an increase in optical intensity every time the wavelength is pulled slightly from the preselected interference pattern state. In the course of one sinusoidal dithering signal swing, the wavelength is slightly too short for half the cycle and slightly too long for the other half of the cycle. This leads to two cycles of increased intensity in the optical intensity of the destructive interference output directed to photodetector 22 for every complete cycle of dithering signal.

The electronic feedback circuit 24 comprises the photodetector 22 and a biasing resistor 48 coupled to a positive DC supply voltage V. The anode of the photodiode 22 is electrically connected via conductor 52 to the lock-in amplifier 26.

The synchronous detection lock-in amplifier 26 is available commercially from several manufacturers, such as Stanford Research Systems, Inc. in Sunnyvale Calif. The amplifier synchronously detects a small electronic signal, complete with phase detection, by using a reference signal having the same frequency and delivers a steady state output voltage with a value corresponding to the amplitude swing of the detected signal and a voltage polarity that reflects the phase of the detected signal in relation to the original reference signal. The output voltage delivered by the commercial amplifier is directly suitable as an electronic drive adjustment signal as will be subsequently described. This electronic drive adjustment voltage can be considered to be an error signal that indicates how far out-of-tune the optical interferometer is and the direction in which this error correction should be applied to return the optical interferometer to the preselected interference state.

As is well known, the photodetector generates a photocurrent in response to optical intensity. Hence, the electronic feedback signal in feedback circuit 24 generated by the photocurrent in photodetector 22 corresponds to a signal that varies with twice the frequency of the dithering signal. Thus the electronic feedback signal conveyed by the conductor 52 to the synchronous detection lock-in amplifier 26 comprises the second harmonic of the dithering frequency. This signal has twice the frequency of the dithering signal frequency. The synchronous lock-in amplifier 26 only amplifies signals that have the same frequency as the dithering signal frequency conveyed to it. Thus, the second harmonic contribution is not amplified by the amplifier 26. This is the normal properly tuned preselected interference state for the optical interferometer, and under these conditions there is no electronic drive adjustment signal generated to cause a correction in the stabilization or tuning of the optical interferometer.

When the interferometer is slightly out of tune, there will be a contribution of the fundamental component of the dithering signal frequency present in the electronic feedback signal that is detected by the lock-in amplifier 26.

An electronic optical path controller 54, preferably a buffer amplifier, translates the electronic drive adjustment signal to the appropriate drive signal necessary to electronically tune the optical path length of leg 30. In the embodiment where the optical interferometer 20 comprises a silica waveguide with an integrated heater, the voltage signal is converted to a current to drive a resistive heater element 56. In the embodiment where the optical interferometer uses an optical fiber and a PZT to stretch the fiber, an amplifier is employed to drive the PZT and create the necessary optical path length change to tune the optical interferometer.

It should be recognized that the stabilizing optical signal supplied through optical fiber 18 and the original optical signal having a wavelength of 1.5 $\mu$m that enters through input 12 interfere independently within the optical interferometer 20. The interferometer is tuned so as to cause the 1.5 $\mu$m light to constructively interfere and deliver light out of the port 28. The opposite interference state will occur for the 0.75 $\mu$m light leading to destructive interference in output port 28, and thus no 0.75 $\mu$m light appears at port 28. Thus, output port 36 emits the 0.75 $\mu$m wavelength optical signal where this light constructively interferes. Since the interference patterns are complementary the light is delivered to different output ports and is conveniently separated. In this invention the only aspect that is necessary is that the constructive interference of the stabilizing optical signal occurs in the output port 36. The state of interference delivered by the 1.5 $\mu$m light in output port 28 can vary as the wavelength or phase of this light is varied.

In operation, the source 16 provides light dithering about a wavelength of 0.75 $\mu$m that is used to stabilize the optical interferometer. Because it is selected to be a multiple of two (i.e. one-half is a multiple of two in that it equals $2^{-1}$) of the 1.5 $\mu$m wavelength that enters input 12, the interference state established by the interferometer at a wavelength of 0.75 $\mu$m is the same as that established for the 1.5 $\mu$m light that enters input 12. That is, there will be constructive interference in one leg and destructive interference in the other leg for both light sources when the interferometer is properly tuned. This invention requires the light entering input 12 to vary about a wavelength that on average remains stable with time so that the optical source 16 can be dithered about a stable fixed wavelength that is a multiple of two of this light entering input 12. Applications where a fixed communication wavelength is actively modulated but is stable over time exist in many long distance wavelength division multiplexed (WDM) fiber optic links. In this invention, the stabilizing source 16 enables the interferometer to be stabilized even though this communication light entering input 12 is varied in wavelength or phase with the information transmitted by the optical link.

The operation just described is directed to the constructive state of interference of the 0.75 $\mu$m light to output 36. The dither in the wavelength applied to the 0.75 $\mu$m light by dither generator 14 will generate the same frequency components in the output electrical signal of photodetector 22 as a function of interferometer 20 tuning as was previously described for the example for destructive interference. In the case of constructive interference, the slight wavelength change in the 0.75 μm light causes a decrease, as opposed to an increase, in the light intensity directed to the photodetector. Thus, for each cycle in the dithering signal, the wavelength changes slightly to cause two decreases in intensity, which again yields an intensity variation at twice the frequency of the dither frequency when the interferometer is properly tuned. Slightly out-of-tuned interferometer states will cause a contribution of the fundamental dither frequency in the electronic feedback signal that is detected by the lock-in amplifier in the same manner as previously described. Thus, the stabilizing optical signal can be used with either constructive or destructive interference in this invention.

In the embodiment shown in FIG. 1, it is convenient to use the constructive state of interference so that the dither signal at a wavelength of 0.75 μm is applied on its own independent interferometer input such that the 0.75 μm light is separated from the output 28, and thus directed to the output 36 where the photodetector 22 receives the constructive interference and provides a feedback signal for tuning the interferometer.

This present invention enables the relative optical path length of an optical interferometer to be actively maintained, even when it is not possible to utilize the original light detected by the interferometer for stabilization because the wavelength of this light is dithered and deliberately not held to a constant wavelength. Accordingly the unbalanced Mach-Zehnder interferometer is stabilized.

As will subsequently be described in more detail relative to FIG. 2, when two outputs are used for optical DPSK communication, it is important that the optical path length of the two output ports 28 and 36 be identical so that the port delivering the digital "ones" is synchronized with the port delivering the "zeros". Since the outputs are complementary, there is a "one" corresponding to light delivered in the one port exactly when there is no light delivered by the other port. If the optical path lengths in each output port are different, the two signals would be delivered at different times, thus degrading the DPSK signal. Thus, for optical DPSK communication, high speed photodetectors must be placed at both outputs 28 and 36. To gain access to output port 36 with photodetector 22 to detect the 0.75 μm stabilization optical signal, a special optical filter is used in output 36 that splits off the 0.75 μm light so it is directed to photodetector 22 without interrupting the output path required by the 1.5 μm light used to recover the optical DPSK signal. This optical filter has the special property that it can split light that differs by a factor of two in wavelength. Most optical filters and wavelength division multiplexers will not separate light that differs in wavelength by a factor of two. An example of an optical filter that can separate light that differs in wavelength by a factor of two is a Bragg grating fiber filter used in retro reflective diffraction in conjunction with an optical circulator.

Figure 2:
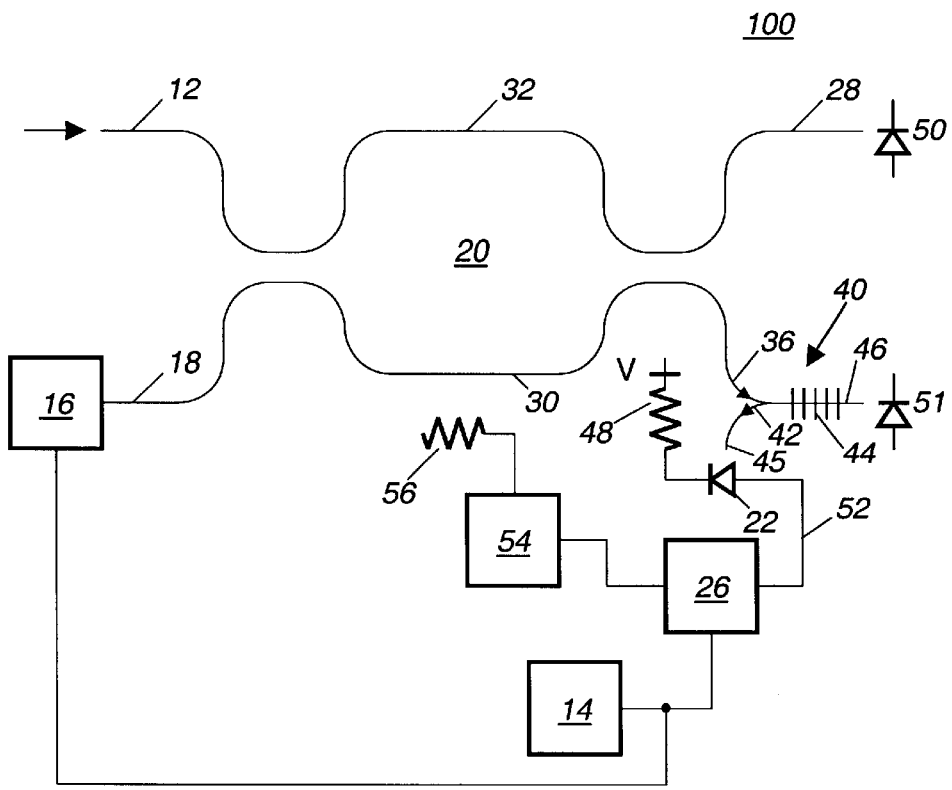
FIG. 2 is a block diagram of another embodiment of the apparatus for stabilizing an optical interferometer that is a dual output Mach-Zehnder interferometer in accordance with the present invention.

With reference now to FIG. 2, there is illustrated another embodiment of an apparatus for stabilizing an optical interferometer 100 made in accordance with the present invention. Many of the parts of the apparatus 100 are identical in construction to like parts of the apparatus 10 illustrated in FIG. 1 and accordingly, there has been applied to each part of the apparatus 100 a reference numeral corresponding to the reference numeral that was applied to the like part of the apparatus described above.

The fundamental differences between the apparatus described above and the apparatus illustrated in FIG. 2 is that a wavelength division demultiplexer or fiber optic filter 40 is used to separate a feedback signal from an interferometer output. This embodiment of the present invention employs a Mach-Zehnder interferometer where both outputs are required and thus one output cannot be dedicated to just deliver the feedback signal. An example of an application that needs both interferometer outputs is one involving the demodulation of DPSK modulation, where the "one" data bits are delivered by one output and the "zeros" are delivered by the other output.

In this embodiment the light in the output 36 is directed into the wavelength demultiplexer 40 which serves as a wavelength selective filter. The demultiplexer 40 comprises an optical circulator 42 and a retro reflector Bragg grating 44 characterized as having a period that is a first order diffractive retroreflector for 0.75 μm light. The grating 44 serves to pass the 1.5 μm light and to diffract just the 0.75 μm light back into the direction from which it came. More particularly, the Bragg grating 44 has a period that equals one-half times 0.75 μm divided by 1.46, which is the effective index of refraction of the fiber. This period of roughly 0.25 μm is half the size of the period needed to diffractively retroreflect 1.5 μm light, and will not effect the 1.5 μm light. Grating periods of this type can be made in optical fiber by holographic exposure using UV laser light as is known in the art. It is important that the length of this grating in the fiber is appropriate so that the retroreflection generally will occur equally for all the wavelengths about which the 0.75 μm source is dithered. Light delivered by the interferometer at 1.5 μm will pass through the circulator 42 and the Bragg grating 44 to the output 46 without retroreflection because the period of the Bragg grating is too small to diffract this light. The length of this path is made identical to that leading to the output 28 for recovery of DPSK modulated light. This 1.5 μm light is detected by high speed photodetectors 50 and 51. The light at a wavelength of 0.75 μm delivered by output 36 is also conveyed through the optical circulator 42, where it is retroreflected by diffraction from Bragg grating 44 and returned into the circulator. In a manner well known in the art the circulator 42 directs this light via the Faraday rotation effect to its other output 45 which directs this light onto photodetector 22.

In operation, the light delivered by the 0.75 μm source is made to deliver constructive interference at the output 36. The wavelength demultiplexer 40 directs this light to the photodetector 22. The photodetector 22 develops the photocurrent signal for use in the feedback circuit 24 for tuning and stabilizing the interferometer 20 in the manner described relative to the embodiment of FIG. 1. The outputs 28 and 46 deliver 1.5 μm light with an interference state that depends upon the particular characteristics of the 1.5 μm light.

It should be recognized that the same type of demultiplexer 40 can be used as a wavelength selective filter in the other output 28. Use of such a wavelength filter allows the small amount of 0.75 μm light that develops in this output during the dither to be separated from the 1.5 μm light providing the "one" data bits. This reduces the noise degradation in this data that occurs from the small amount of 0.75 μm light present in this output.

The stabilization approach using a second optical signal with a wavelength that is a factor of two of the original optical signal also is used to stabilize a plurality of optical interferometers. In such an application, an optical source has its wavelength dithered as previously described. A portion of the light from this single dithered source is send into each of the plurality of optical interferometers via a splitter. The photo detector associated with each interferometer creates a unique electronic signal representative of the state of tuning of that particular interferometer. Each unique electronic signal is synchronously detected by a dedicated lock-in amplifier that generates the appropriate error correction signal for each interferometer in the same manner as was described relative to the embodiment shown in FIG. 1. Each error correction signal individually adjusts the particular optical path of the interferometer which caused the photo-detector to create a signal. This enables individual tuning of each interferometer. In this way, a single dithered optical signal with a wavelength that is a factor of two of the original optical signal is used to stabilize a plurality of optical interferometers.

Obviously, many modifications and variations of the present invention are possible in view of the above teachings. Thus, it is to be understood that, within the scope of the appended claims, the invention may be practiced otherwise than as specifically described above.

What is claimed is:

1. An apparatus for stabilizing an optical interferometer providing operation on a first optical signal having a first wavelength comprising:

means for generating a dithering signal;

means for generating a second optical signal having a second wavelength that differs from the first wavelength by a factor of two;

means applying a portion of said dithering signal to the second optical signal so as to provide a dithered optical signal having a second wavelength that varies in accordance with the dithering signal;

an optical interferometer having an optical path length that is tunable, said optical interferometer being responsive to the first optical signal and being operative to develop a first interference pattern when said optical path length is a prescribed value and being responsive to said dithered optical signal and a path length adjustment drive signal and being operative to develop a dithered interference pattern, said dithered interference corresponding to a tuned interference pattern when said optical path length is said prescribed value, said tuned interference pattern causing said optical interferometer to develop said first interference pattern, and corresponding to an out-of-tune interference pattern when said optical path length is not said prescribed value;

means responsive to said dithered optical interference pattern and being operative to develop an electronic feedback signal when said tuned interference pattern is not present; and means responsive to a portion of said dithering signal and said electronic feedback signal and operative to produce said optical path length adjustment drive signal, said optical path length adjustment drive signal serving to tune the optical path length until it reaches said prescribed value, thereby producing said tuned interference pattern, whereby said optical interferometer develops said first interference pattern and stabilizes said optical interferometer.

2. The apparatus as set forth in claim 1, wherein said optical interferometer is of the Mach-Zehnder type.

3. The apparatus as set forth in claim 1, wherein said means responsive to a portion of said dithering signal and said electronic feedback signal comprises a photodetector.

4. The apparatus as set forth in claim 1, wherein the means responsive to said electronic feedback signal comprises a synchronous detection lock-in amplifier means including a heater, said amplifier means responding to said dithered signal and said electronic feedback signal and serving to change the temperature of, and hence adjust the optical path length.

5. The apparatus as set forth in claim 1, wherein said means responsive to a portion of said dithering signal and electronic feedback signal comprises synchronous detection lock-in amplifier means for developing said optical path length adjustment signal and a piezoelectric transducer that serves to adjust the optical path length in response to said optical path length adjustment signal.

6. The apparatus as set forth in claim 1, wherein said optical interferometer includes a first output for delivering a "one" data bit and a second output for delivering a "zero" data bit and wherein the first optical signal has DPSK modulation.

7. The apparatus as set forth in claim 6, wherein said second output comprises a wavelength demultiplexer for separating the first optical signal light at said first wavelength that delivers a "zero" data bit to said second output from the second optical signal light at said second wavelength that delivers said dithered interference pattern.

8. The apparatus as set forth in claim 7, wherein said wavelength demultiplexer comprises an optical circulator and a Bragg grating.

9. The apparatus as set forth in claim 8, wherein said Bragg grating has a period such that it serves as a retro reflector for the shorter wavelength of said first and said second optical signals.

10. The apparatus as set forth in claim 1, and further comprising a plurality of optical interferometers, said first and said second optical signals serving to stabilize said plurality of optical interferometers.

11. A method of tuning an optical interferometer operating on a first optical signal having a first wavelength comprising:

applying the first optical signal to the optical interferometer to produce a preselected interference pattern;

generating a dithering signal;

generating a second optical signal having a second wavelength that differs from the first wavelength by a factor of two;

applying a portion of the dithering signal to the second optical signal to vary its wavelength;

applying the varying wavelength optical signal to the optical interferometer so as to create a dithered interference pattern, said dithered interference pattern corresponding to an optical path length;

developing a dithered electronic signal representative of the dithered interference pattern;

developing a drive signal from a portion of the dithering signal and the electronic signal; and applying the drive signal in a manner to adjust the optical path length such that the dithered interference pattern is formed so that the preselected interference pattern is delivered by said optical interferometer, thereby tuning the optical interferometer.

12. The method as set forth in claim 11, wherein the step of developing a drive signal comprises the steps of detecting a signal having the second wavelength, and amplifying the second wavelength signal.

13. The method as set forth in claim 12, wherein the step of applying a drive signal includes applying current to a heater, and changing the temperature of the optical path length, thereby adjusting it until said preselected interference pattern is formed.

14. The method as set forth in claim 12, wherein the step of applying a drive signal that includes applying a voltage to a piezo electric transducer, and changing its optical path length until said preselected interference pattern is formed.

15. The method as set forth in claim 11, wherein the optical interferometer includes a first output and a second output, and further comprising the step of applying an optical signal having DPSK modulation, such that "one" data bits appear on the first output and "zero" data bits appear on the second output.

16. The method as set forth in claim 15, and further comprising the step of supplying the interference pattern to a wavelength multiplexer, providing a "zero" data bit to said second output when said first wavelength is present, and providing said dithered interference pattern at a third output from said second optical signal at said second wavelength.

17. The method as set forth in claim 16, wherein said wavelength multiplexer comprises an optical circulator and a Bragg grating.

18. The method as set forth in claim 17, wherein said Bragg grating serves as a retro reflector for the shorter wavelength of said first and second optical signals.

19. The method as set forth in claim 11, and further comprising a plurality of optical interferometers, said varying wavelength optical signal being applied to said plurality of optical interferometers so as to stabilize said plurality of optical interferometers.

* * * * *